(12) United States Patent
Jang

(10) Patent No.: US 7,336,478 B2
(45) Date of Patent: Feb. 26, 2008

(54) MONITOR APPARATUS

(75) Inventor: Se-Ki Jang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/921,980

(22) Filed: Aug. 20, 2004

(65) Prior Publication Data

US 2005/0041379 A1 Feb. 24, 2005

(30) Foreign Application Priority Data

Aug. 21, 2003 (KR) ............... 10-2003-0058029

(51) Int. Cl.
*G06F 1/16* (2006.01)

(52) U.S. Cl. .................. 361/681; 248/917; 248/920

(58) Field of Classification Search ............. 361/681, 361/682; 248/286.1, 917, 920, 919
See application file for complete search history.

(56) References Cited

U.S. PATENT DOCUMENTS

| | | | | |
|---|---|---|---|---|
| 5,854,735 | A * | 12/1998 | Cheng | 361/681 |
| 6,164,611 | A * | 12/2000 | Kuhnke | 248/279.1 |
| 6,189,842 | B1 * | 2/2001 | Bergeron Gull et al. | 248/125.1 |
| 6,189,850 | B1 | 2/2001 | Liao et al. | |
| 6,288,891 | B1 * | 9/2001 | Hasegawa et al. | 361/681 |
| 6,326,978 | B1 | 12/2001 | Robbins | |
| 6,330,993 | B1 | 12/2001 | Cho | |
| 6,427,288 | B1 * | 8/2002 | Saito | 16/361 |
| 6,639,788 | B1 * | 10/2003 | Liao et al. | 361/681 |
| 6,712,321 | B1 * | 3/2004 | Su et al. | 248/123.11 |
| 6,874,738 | B2 * | 4/2005 | Ishizaki et al. | 248/176.3 |
| 2004/0084585 | A1 * | 5/2004 | Watanabe et al. | 248/276.1 |

FOREIGN PATENT DOCUMENTS

| | | |
|---|---|---|
| JP | 2000-206893 | 7/2000 |
| KR | 1999-40596 | 6/1999 |
| KR | 2000-500 | 1/2000 |
| KR | 10-296283 | 5/2001 |
| KR | 20-250276 | 9/2001 |

OTHER PUBLICATIONS

Chinese Office Action for corresponding Application No. 2004-100569216 dated Jul. 7, 2006.

* cited by examiner

*Primary Examiner*—Jayprakash Gandhi
*Assistant Examiner*—Ingrid Wright
(74) *Attorney, Agent, or Firm*—Staas & Halsey LLP

(57) ABSTRACT

A monitor apparatus includes a monitor main body displaying a picture; a base member supporting the monitor main body; a connecting member combined to the base member, and supporting the monitor main body to be pivoted; a first guide plate having a first side pivotably combined to the connecting member, and a second side to be slidably combined to the monitor main body; a sliding unit provided between the first guide plate and the monitor main body and supporting the first guide plate to be slidable on the monitor main body; and a link unit having a first side combined to a rear side of the monitor main body and a second side combined with the connecting member, the monitor main body moves up and down with respect to the base member by sliding on the first guide plate when the first guide plate pivots with respect to the connecting member.

51 Claims, 8 Drawing Sheets

MONITOR APPARATUS

CROSS-REFERENCE TO RELATED APPLICATIONS

This application claims the benefit of Korean Patent Application No. 2003-58029, filed on Aug. 21, 2003, in the Korean Intellectual Property Office, the disclosure of which is incorporated herein by reference.

BACKGROUND OF THE INVENTION

1. Field of the Invention

The present invention relates to a monitor apparatus, and more particularly, a monitor apparatus improved in a pivoting structure of a monitor main body relative to a base member.

2. Description of the Related Art

A monitor apparatus, in general, comprises a monitor main body, and a base member disposed on a flat surface like a table, to support the monitor main body.

Recently, a monitor main body is produced using an image display panel such as an LCD (Liquid Crystal Display) and a PDP (Plasma Display Panel) which make the monitor main body slim comparable to the size of a screen.

By using such a flat-typed image display panel, the monitor apparatus has an advantage of reducing its volume remarkably, and thus can be designed to be easily controlled in various angles of a clockwise and counterclockwise direction and a rotating direction for a user's convenience, and such a flexibility is recently in demand.

Especially, a pivoting function, rotating about the clockwise and counterclockwise direction of the monitor main body for the user's convenience, is increasing in demand in manufacturing the monitor apparatus.

However, if the monitor apparatus is pivoted as described above, a corner of the monitor main body contacts with the base member and the flat surface on which the base member is located causing problems of limiting or disabling the pivoting function of the monitor apparatus because a distance between the monitor main body and the base member or between the monitor main body and the flat surface where the base member is located is not sufficient. Such problems are obvious in a wide monitor apparatus which is increasing in demand recently.

Another problem is that when the monitor main body is pivoted without having its angle and height adjusted to match with a user's eye level, the user may feel uncomfortable watching the monitor.

Therefore, adjusting methods have been provided to control the angle and the height of the monitor main body.

However, two separate methods are provided in a conventional monitor apparatus, one for pivoting the monitor main body and the other for adjusting the angle and the height of the monitor main body, and both methods need to be operated separately. Thus, it is inconvenient and complicated to pivot the monitor main body and to adjust its angle and height simultaneously.

SUMMARY OF THE INVENTION

Accordingly, it is an aspect of the present invention to provide a monitor apparatus preventing a corner of a monitor main body from contacting with a base member or a flat surface on which the monitor is located, by controlling a distance between the monitor main body and the base member while the monitor main body is pivoting relative to the base member.

Additional aspects and/or advantages of the invention will be set forth in part in the description which follows and, in part, will be obvious from the description, or may be learned by practice of the invention.

The foregoing and/or other aspects of the present invention are achieved by providing a monitor apparatus comprising a monitor main body displaying an image; a base member supporting the monitor main body; a connecting member combined to the base member, and supporting the monitor main body to be pivoted; a first guide plate having a first side pivotably combined to the connecting member, and a second side to be slidably combined to the monitor main body; a sliding unit provided between the first guide plate and the monitor main body and supporting the first guide plate to be slidable on the monitor main body; and a link unit having a first side combined to a rear side of the monitor main body and a second side combined with the connecting member, wherein the monitor main body moves up and down with respect to the base member by sliding on the first guide plate when the first guide plate pivots with respect to the connecting member.

According to an aspect of the present invention, the first guide plate comprises a guide groove, wherein the second side of the link unit passes through the guide groove of the first guide plate and combines with the connecting member, and the guide groove of the first guide plate is formed to prevent the first guide plate from being interrupted by the link unit when the first guide plate is pivoting with respect to the connecting member.

According to an aspect of the present invention, the guide groove of the first guide plate limits an angle formed when the monitor main body is pivoting with respect to the base member, and the length of the guiding groove is predetermined depending on a range of the limited pivoting angle.

According to an aspect of the present invention, the sliding unit comprises a guide rail combined to one of the first guide plate and a rear side of the monitor main body; and a sliding member combined to one of the first guide plate and the rear side of the monitor main body to be slidably combined to the guide rail.

According to an aspect of the present invention, the monitor apparatus further comprises a second guide plate provided between a rear side of the monitor main body and one of the guide rail and the sliding member, which is combined to the rear side of the monitor main body, wherein the first side of the link unit is combined to the second guide plate.

According to an aspect of the present invention, the monitor apparatus further comprises a pivoting bracket provided between the connecting member and the first guide plate, wherein the first guide plate is pivotably combined with the pivoting bracket, and the second side of the link unit is combined with the pivoting bracket.

According to an aspect of the present invention, one of the pivoting bracket and the first guide plate comprises a pivoting shaft, and the other one of the pivoting bracket and the first guide plate comprises a pivoting shaft hole pivotably accommodating the pivoting shaft.

According to an aspect of the present invention, the pivoting shaft protrudes and passes through the pivoting shaft hole.

According to an aspect of the present invention, the pivoting shaft comprises a stopper on an end part thereof to prevent the pivoting shaft from being loosened from the pivoting shaft hole.

According to an aspect of the present invention, the stopper is bent such that the end part of the pivoting shaft which passes through the pivoting shaft hole contacts with an edge of the pivoting shaft hole, to generate rotation friction between the pivoting bracket and the first guide plate.

According to an aspect of the present invention, the monitor apparatus further comprises a washer disposed between the pivoting shaft and the pivoting shaft hole.

According to an aspect of the present invention, the pivoting bracket is tiltably combined with the connecting member.

BRIEF DESCRIPTION OF THE DRAWINGS

These and/or other aspects and advantages of the invention will become apparent and more readily appreciated from the following description of the embodiments, taken in conjunction with the accompany drawings of which.

DETAILED DESCRIPTION OF THE PREFERRED EMBODIMENTS

Figure 1:
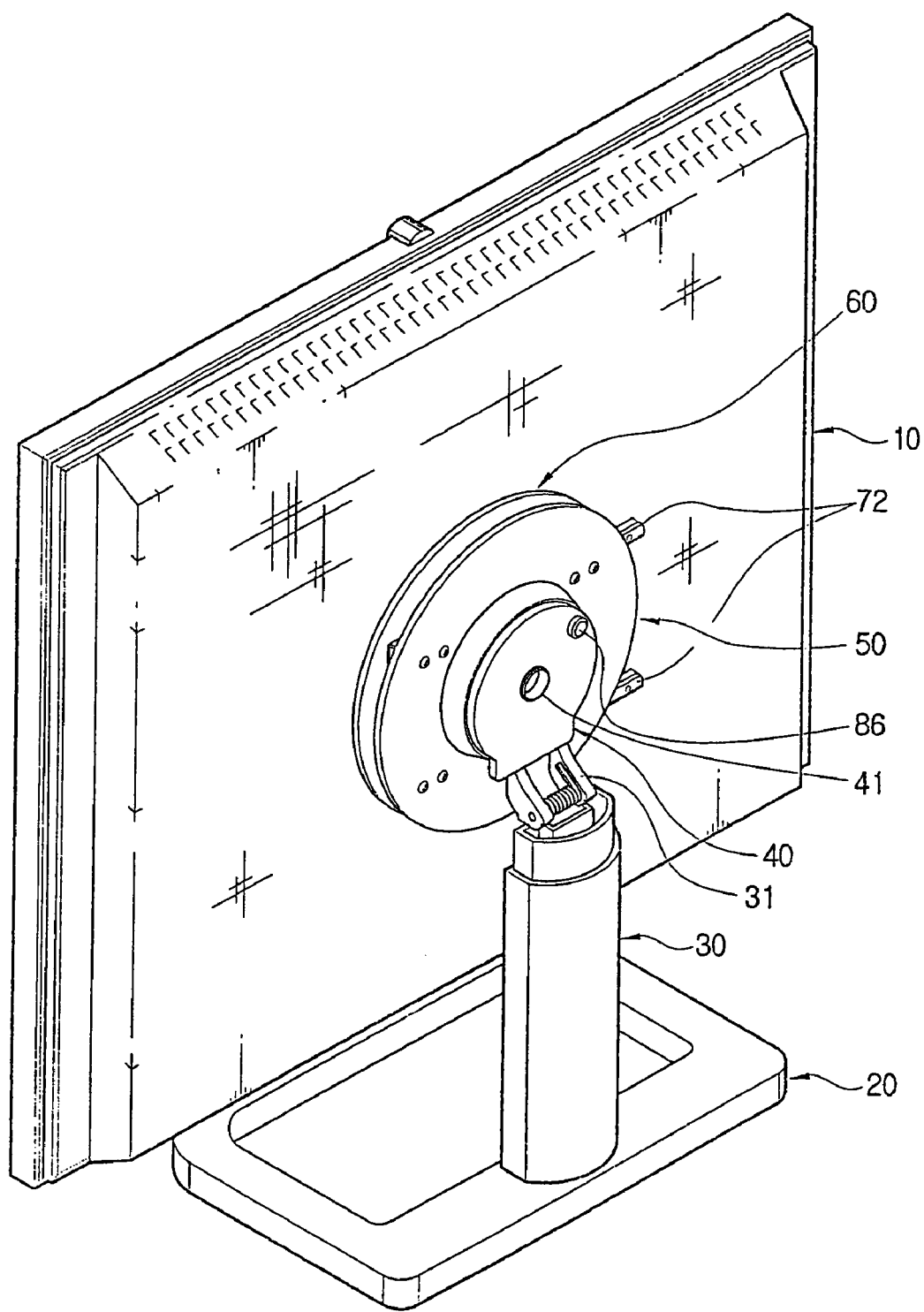
FIG. 1 is a perspective backside view of a monitor apparatus according to an embodiment of the present invention.
Figure 2:
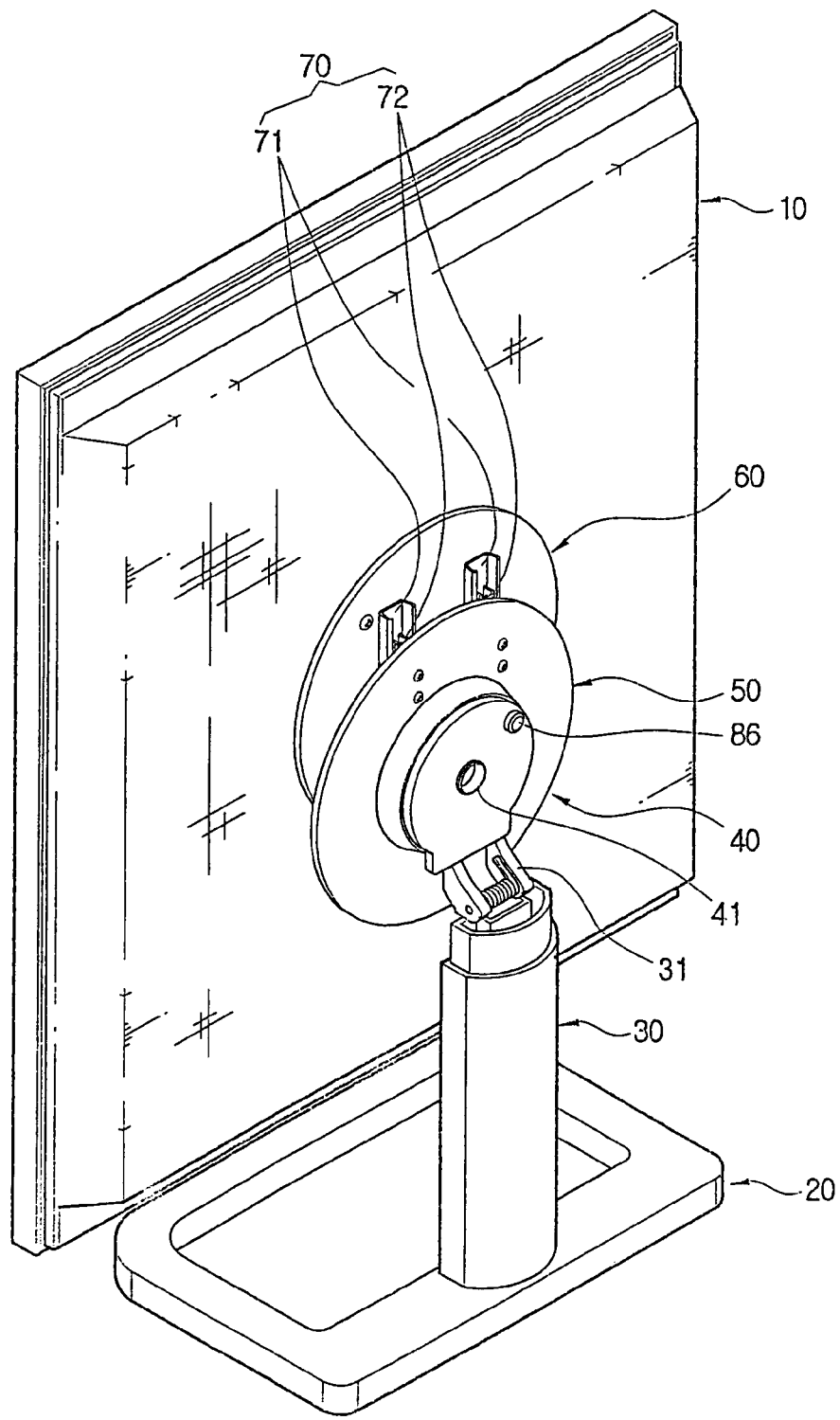
FIG. 2 is a perspective backside view of a monitor main body in a state of pivoting.
Figure 3:
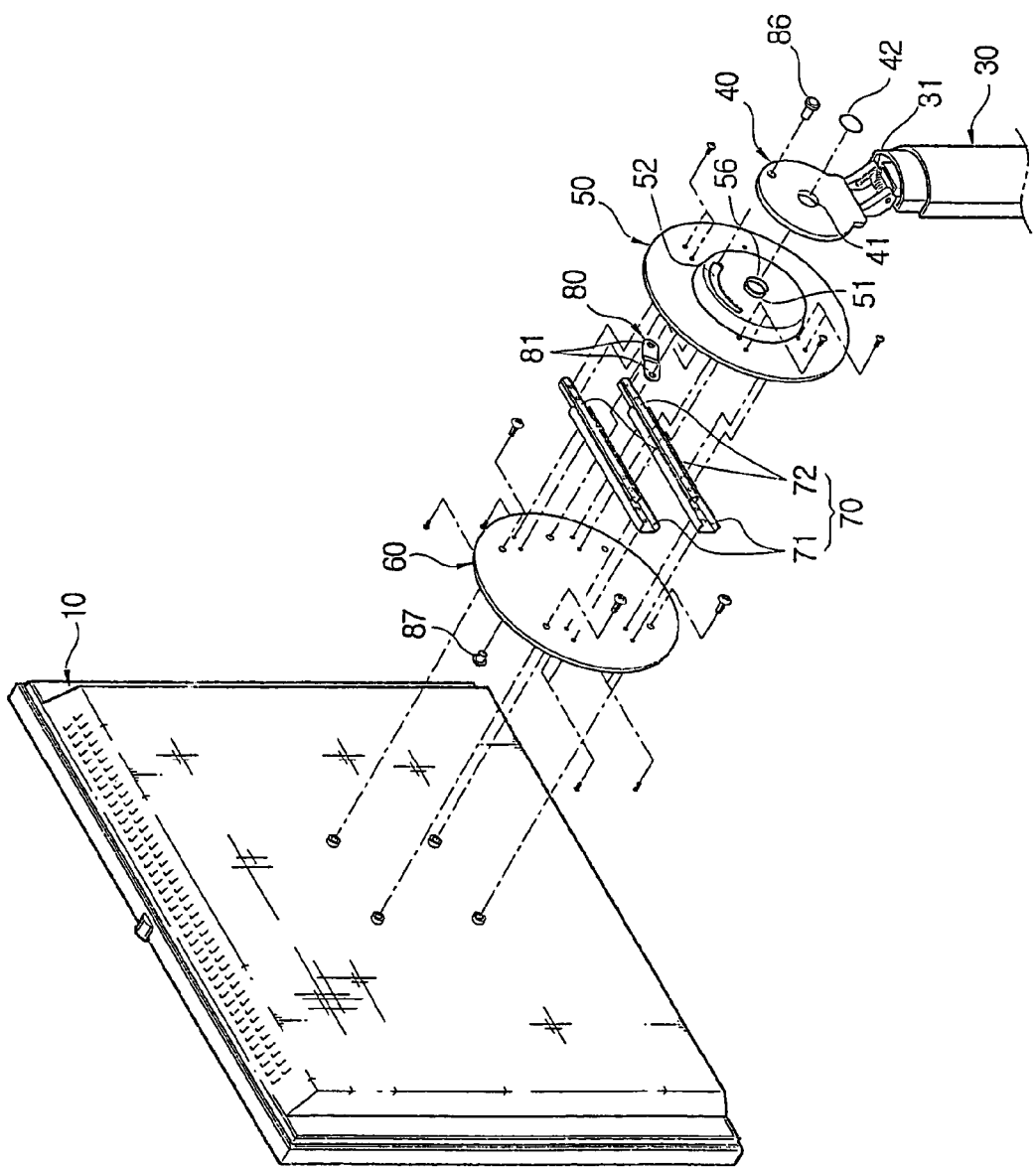
FIG. 3 is an exploded perspective view of a pivoting structure of FIG. 1.

Reference will now be made in detail to the embodiments of the present invention, examples of which are illustrated in the accompanying drawings, wherein like reference numerals refer to like elements throughout. The embodiments are described below to explain the present invention by referring to the figures.

An example of a monitor apparatus to be described hereafter will be an LCD (Liquid Crystal Display) and a PDP (Plasma Display Panel), wherein a flat image display panel is provided.

Also, as terminologies to be described in a detailed description of an embodiment of the present invention, a pivoting direction refers to the monitor main body rotating about a clockwise and counterclockwise direction, and a tilting direction refers to the monitor main body rotating about a forward and backward direction relative to a connecting member.

In FIG. 1 through FIG. 6, the monitor apparatus according to the embodiment of the present invention comprises a monitor main body 10; a base member supporting the monitor main body; a connecting member 30 connecting the base member 20 and the monitor main body 10; a pivoting bracket 40 provided between the monitor main body 10 and the connecting member 30, and supporting the monitor main body 10 to be pivoted; a first guide plate 50 provided between the pivoting bracket 40 and the monitor main body 10, and pivotably connected with the pivoting bracket 40; a second guide plate 60 having a first side combined to a rear side of the monitor main body 10 and a second side combined to the first guide plate 50; a sliding unit 70 provided between the first guide plate 50 and the second guide plate 60, and combining the second guide plate 60 to be able to slide on the first guide plate 50; and a link unit 80 having a first side combined to the second guide plate 60 and a second side passing through the first guide plate 50 and combined to the pivoting bracket 40, and thus connecting the second guide plate 50 and the pivoting bracket 40.

The monitor main body 10 generates an image using the flat-typed image display panel like the LCD and the PDP.

The base member 20 is located on a flat surface such as a table on which the monitor apparatus is located and supports the monitor main body 10.

A bottom part of the connecting member 30 is combined to the base member 20, and an upper part of the connecting member 30 is tiltably combined with the pivoting bracket 40. A tilting hinge 31 is provided in the upper part of the connecting member 30 to be tiltably combined with the pivoting bracket 40.

The first guide plate 50 comprises a guide groove 52, and a first side which slides on the second guide plate 60 by the sliding unit 70, and a second side with a pivoting shaft 51 protruded rearward.

The pivoting bracket 40 comprises a pivoting shaft hole 41 rotatably combined with the pivoting shaft 51 on a first side thereof, and a second side of the pivoting bracket 40 is combined with the connecting member 30.

The pivoting shaft 51 protrudes from a center area of the first guide plate 50 and passes through the pivoting shaft hole 41, preventing the pivoting shaft 51 from being loosened from the pivoting shaft hole 41 by having a stopper 56 at an end of the pivoting shaft 51. The pivoting shaft 51 comprises at least one washer 42 combined thereto.

The stopper 56 is bent, wherein the end part of the pivoting shaft 51 which passes through the pivoting shaft hole 41 contacts with an edge of the pivoting shaft hole 41, generating rotation friction between the pivoting bracket 40 and the first guide plate 50. The rotation friction is overcome and the monitor main body 10 becomes rotatable by a predetermined force applied by a user.

The washer 42 is provided either between the first guide plate 50 and the pivoting bracket 40, or between the first guide plate 50 and the stopper 56, and provides elasticity to generate the predetermined rotation friction between the first guide plate 50 and the pivoting bracket 40.

The sliding unit 70 comprises at least one guide rail 71 and a sliding member 72 slidably engaged to the guide rail 71. The guide rail 71 is combined to one of the first guide plate 50 and the second guide plate 60, and the sliding member 72 is combined to one of the first guide plate 50 and the second guide plate 60. According to the embodiment of the present invention, a pair of guide rails 71 is combined to the second guide plate 60, and a pair of sliding members 72 slidably engaged to the pair of guide rails 71 is combined to the first guide plate 50.

The pair of guide rails 71 is combined with the pair of sliding members 72 accommodated therein, wherein the pair of sliding members reciprocatingly slide along the pair of guide rails 71.

Unlike the embodiment described above, the pair of guide rails 71 may be combined to a rear side of the monitor main body 10 without being combined to the second guide plate 60, and the link unit 80 may be directly combined to a rear side of the monitor main body 10, and thus the second guide plate 60 may not be necessary. However, the second guide plate 60 should be included to increase efficiency of producing monitor apparatus according to the embodiment of the present invention in an assembling process.

The link unit 80 passes through the guide groove 52 of the first guide plate 50 and is combined to the pivoting bracket 40 at a position separate from a center of the pivoting shaft 51 accommodated in the pivoting bracket 41.

Thus, the link unit 80 controls the second guide plate 60 to slide on relative to the first guide plate 50, and thus the monitor main body 10 is moved upward relative from the base member 20 when the first guide plate 50 is pivoting relative to the pivoting bracket 40.

The link unit 80 comprises a screw hole 81 respectively formed in end parts thereof, wherein a first hinge shaft 86 and a second hinge shaft 87 are respectively combined to each of the screw holes 81, and spirals (not shown) formed in end parts of the first hinge shaft 86 and the second hinge shaft 87, the link unit 80 is combined relative to the first guide plate 50 and the pivoting bracket 40. Thus, the link unit 80 is rotatably combined to the second guide plate 60 and the pivoting bracket 40.

Figure 7:
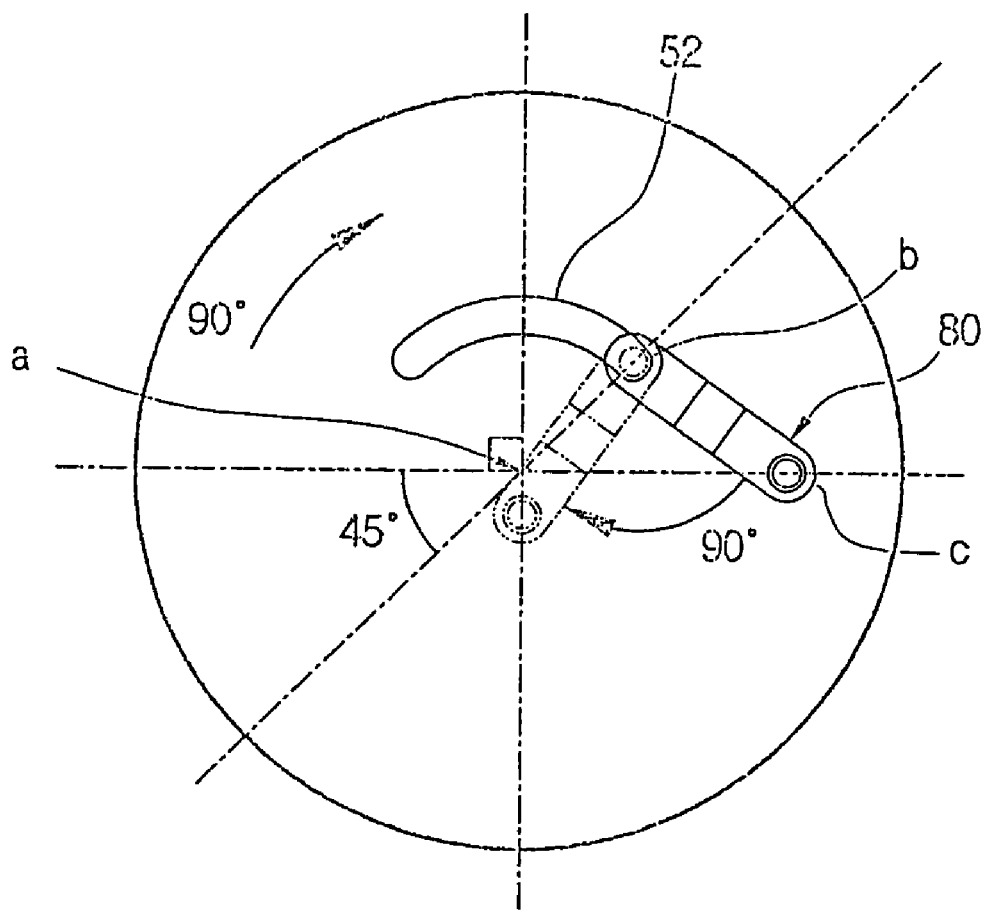
FIGS. 7 and 8 are schematic views of an operation of a link unit used in the monitor apparatus according to the embodiment of the present invention.
Figure 8:
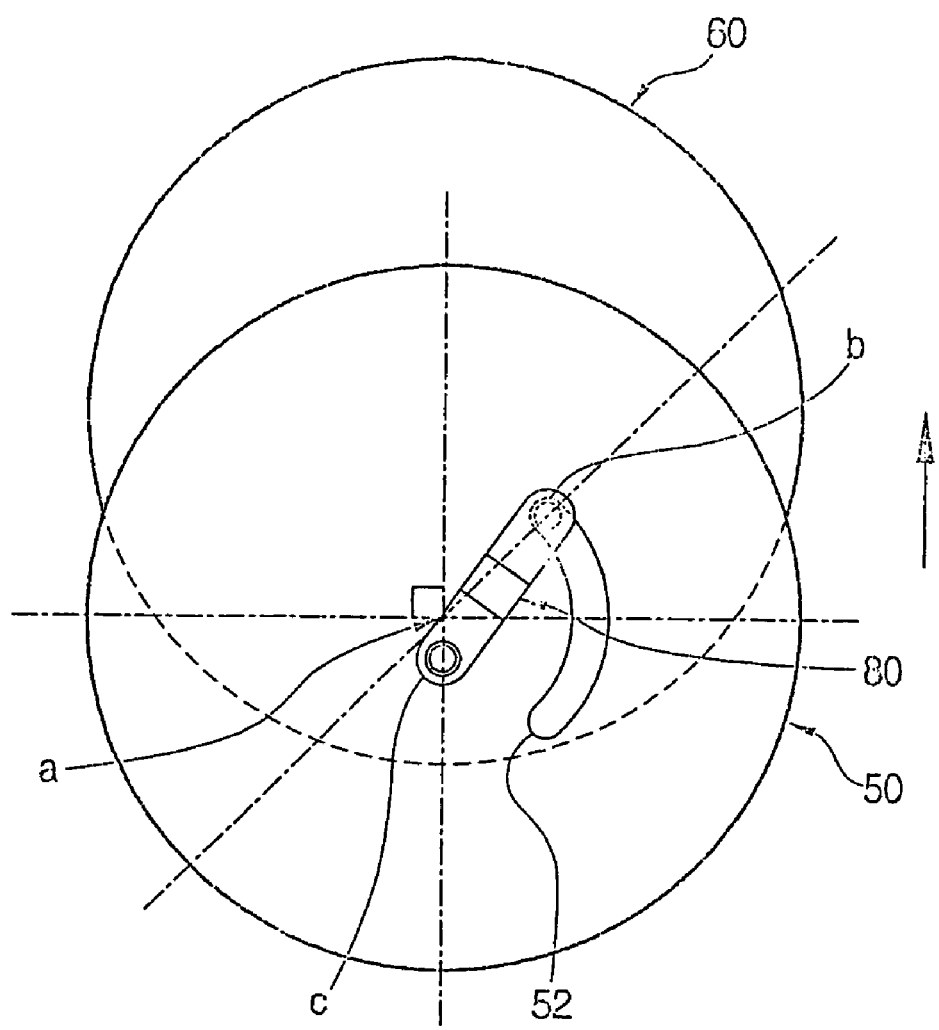

A detailed description about an operation mechanism of the link unit 80 according to the embodiment of the present invention is as follows. In FIG. 7 and FIG. 8, the link unit 80 is combined to an upper part of the pivoting bracket 40 in a point (b) located on an axis clockwise rotated about a center (a) of the pivoting shaft 51 at an angle of approximately 45 degrees with a vertical axis passing, and combined to the second guide plate 60 in a point (c) located on an axis passing the center (a) of the pivoting shaft 51 and separated farther than the point (b) where the link unit 80 is combined to the pivoting bracket 40 from the center (a) of the pivoting shaft 51.

When the first guide plate is pivoting by rotating clockwise at an angle of 90 degrees relative to the pivoting bracket 40, the second guide plate 60 slidably combined with the first guide plate 50 rotates along the first guide plate 50. The link unit 80 is combined to the second guide plate 60, therefore the link unit 80 also rotates clockwise about the point (b) where the link unit 80 and the pivoting bracket are combined to each other. Here, the link unit 80 rotates at an angle of 90 degrees, thus the point (c) is located in a lower part of the pivoting bracket 40. Herein, the link unit 80 rotates as much as the first guide plate 50 is rotated.

According to the operation of the link unit 80 described above, when the first guide plate 50 is pivoting relative to the pivoting bracket 40, the second guide plate 60 slides upward relative to the first guide plate 50 by the link unit 80.

Based on this operation, an angle and a height of the monitor main body 10 are adjusted relative to the base member 20 by pivoting the first guide plate 50 clockwise and counter clockwise relative to the pivoting bracket 40 depending on combination locations of the link unit 80 and the pivoting bracket 40, and of the link unit 80 and the second guide plate 60

Figure 4:
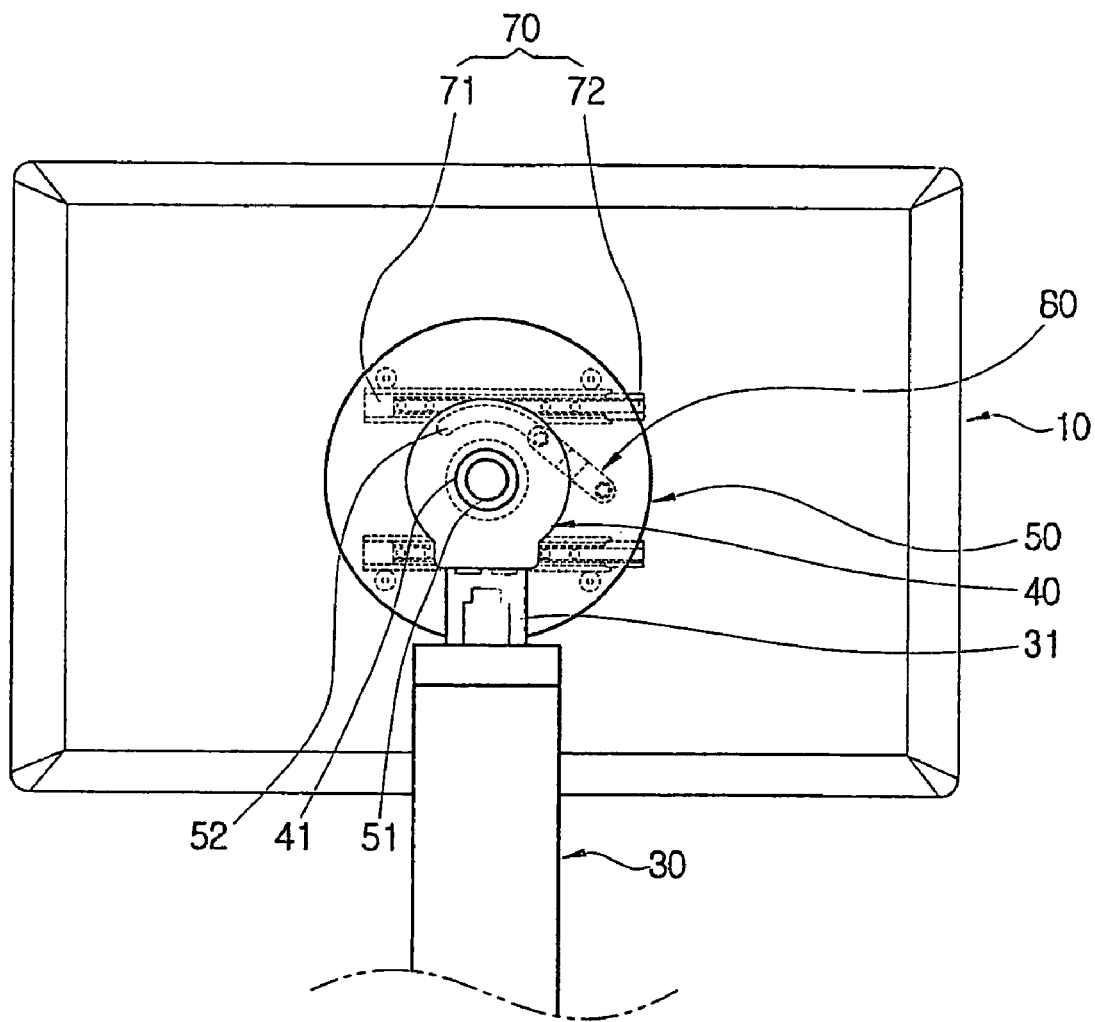
FIG. 4 is a front view of the pivoting structure of FIG. 1.
Figure 5:
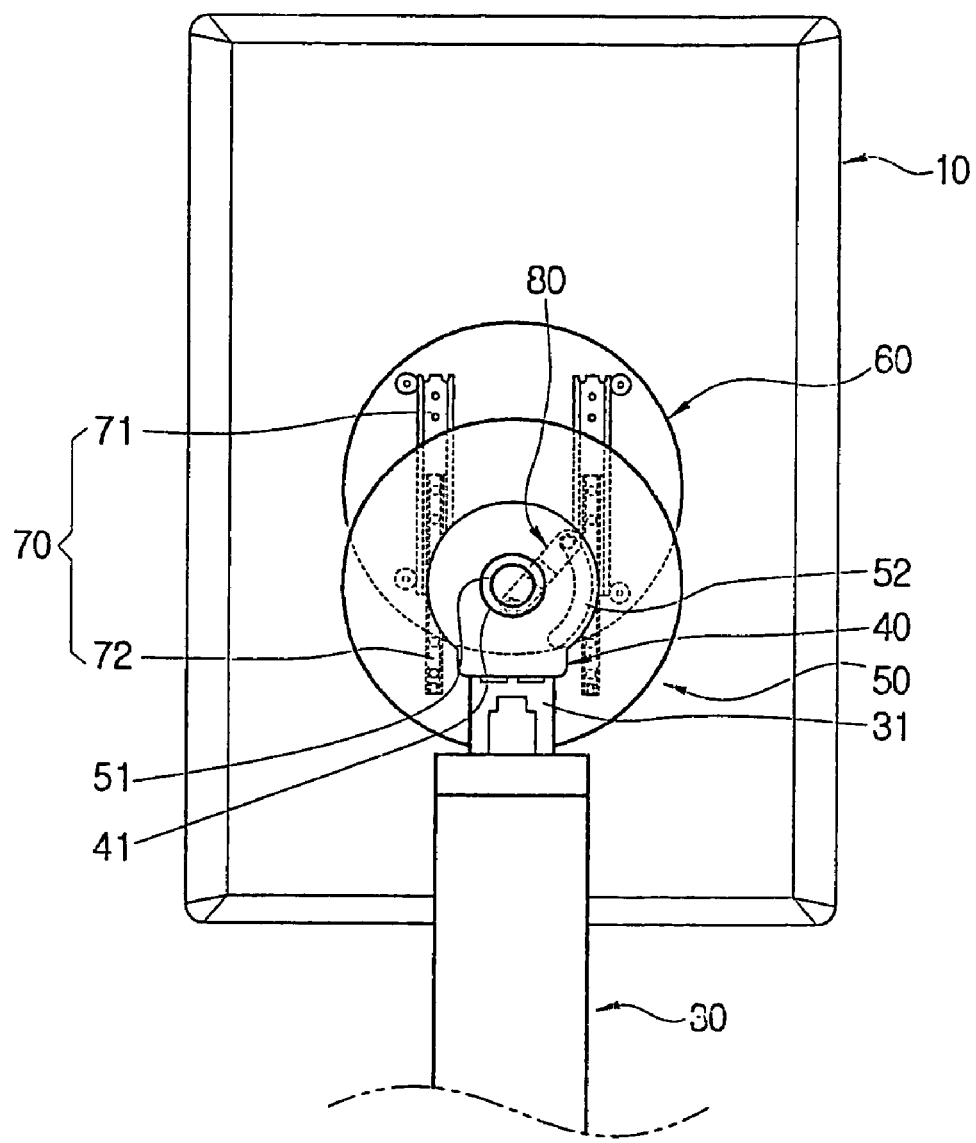
FIG. 5 is a front view of the pivoting structure of FIG. 2.
Figure 6:
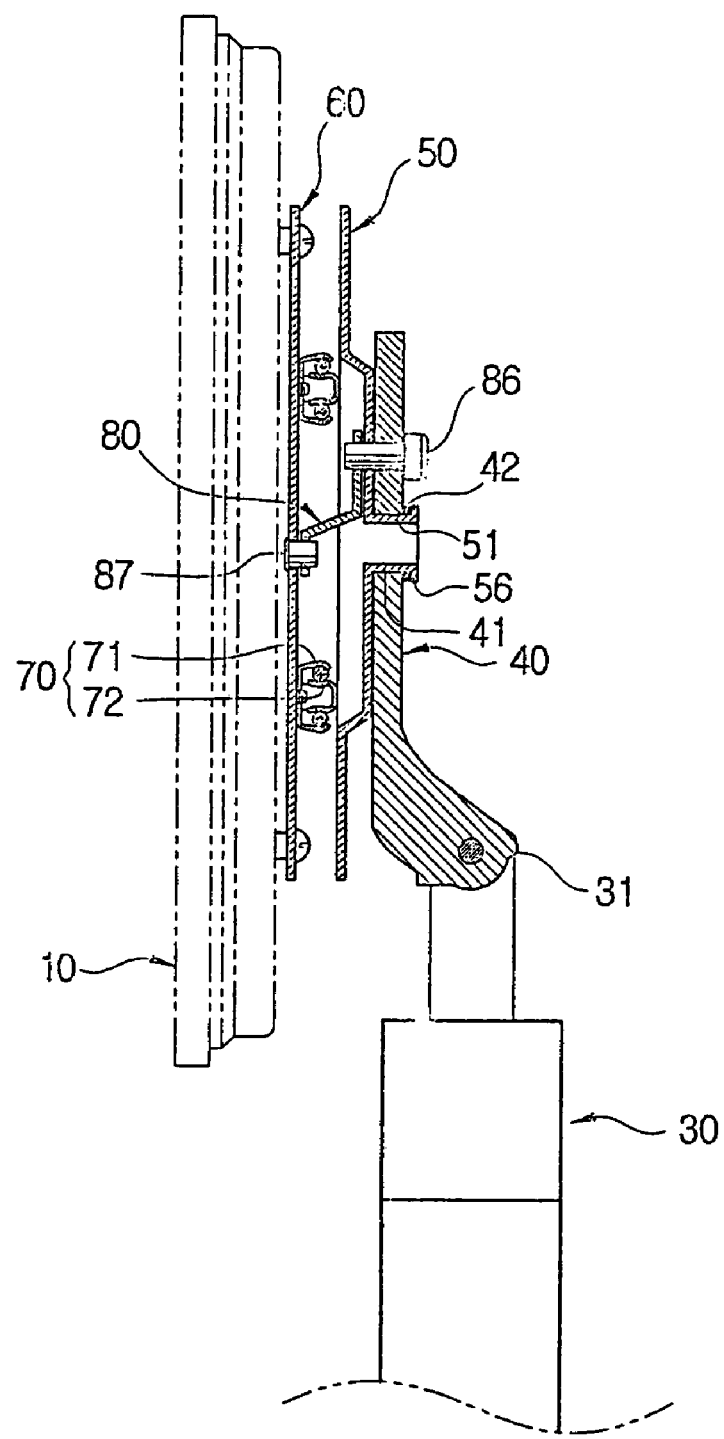
FIG. 6 is a side view of the pivoting structure of FIG. 1.

The guide groove 52, as shown in FIG. 4 and FIG. 5, is not to be interrupted by the link unit 80 which penetrates the first guide plate 50. Also, the guide groove 52 limits a pivoting angle of the monitor main body 10 relative to the base member 20, and comprises a predetermined length depending on a range limited to desired angles of pivoting.

With such a configuration above, the operation of the monitor apparatus according to the embodiment of the present invention is as follows.

First, the monitor main body 10 rotates clockwise to pivot relative to the base member 20, and the rotation causes the first guide plate 50 and the second guide plate 60 provided in a rear side of the monitor main body 10 to rotate relative to the pivoting bracket 40. The link unit 80, which passes through the first guide plate 50 and connects the second guide plate 60 with the pivoting bracket 40, moves along the second guide plate 60 and thus, the point where the link unit 80 and the pivoting bracket 40 are combined rotates clockwise about a center axis of rotation. Here, the link unit 80 rotates as much as the first guide plate 50 rotates. However, the first guide plate 50 and the link unit 80 have different center axes of rotation, and thus the link unit 80 mechanically controls the second guide plate 60 to slide on the first guide plate 50 according to the operation of the link unit 80 described above, and the monitor main body 10 is raised relative to the base member 20. Accordingly, the monitor main body 10 is raised at the same time it pivots relative to the base member 20.

Herein, the monitor apparatus according to the embodiment of the present invention is designed to prevent a corner of a monitor main body from contacting with a base member or a flat surface on which the monitor apparatus is located when the monitor main body is pivoting relative to the base member by controlling a distance between the monitor main body and the base member. Also, the monitor main body maintains a proper height and angle corresponding to a user's eyelevel.

Although a few embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A monitor apparatus comprising:
   a monitor main body displaying an image;
   a base member supporting the monitor main body;
   a connecting member combined to the base member, and supporting the monitor main body to be pivoted;
   a first guide plate having a first side pivotably combined to the connecting member, and a second side to be slidably combined to the monitor main body;
   a sliding unit provided between the first guide plate and the monitor main body and supporting the first guide plate to be slidable on the monitor main body, wherein the sliding unit comprises:
      at least one guide rail combined to one of the first guide plate and a rear side of the monitor main body, and
      a sliding member combined to the other one of the first guide plate and the rear side of the monitor main body to be slidably combined to the guide rail; and
   a link unit having a first side rotatably combined with respect to the first guide plate and a second side combined with the connecting member, wherein the link unit is separately disposed from the sliding unit such that the monitor main body moves up and down with respect to the base member by sliding on the first guide plate via the sliding unit as the first guide plate pivots with respect to the connecting member via the link unit.

2. The monitor apparatus of claim 1, wherein the first guide plate comprises a guide groove, wherein the second side of the link unit passes through the guide groove and is combined to the connecting member, and the guide groove is formed to prevent the first guide plate from being interrupted by the link unit when the first guide plate is pivoting with respect to the connecting member.

3. The monitor apparatus of claim 2, wherein the guide groove of the first guide plate limits an angle formed when the monitor main body is pivoting with respect to the base member, and the length of the guiding groove is predetermined depending on a range of the angle.

4. The monitor apparatus of claim 1, further comprising a second guide plate provided between the rear side of the monitor main body and the at least one guide rail and the sliding member, which is combined to the rear side of the monitor main body, wherein the first side of the link unit is combined to the second guide plate.

5. The monitor apparatus of claim 1, further comprising a pivoting bracket provided between the connecting member and the first guide plate, wherein the first guide plate is pivotably combined with the pivoting bracket, and the second side of the link unit is combined with the pivoting bracket.

6. The monitor apparatus of claim 5, wherein one of the pivoting bracket and the first guide plate comprises a pivoting shaft, and the other one of the pivoting bracket and the first guide plate comprises a pivoting shaft hole pivotably accommodating the pivoting shaft.

7. The monitor apparatus of claim 6, wherein the pivoting shaft protrudes and passes through the pivoting shaft hole.

8. The monitor apparatus of claim 7, wherein the pivoting shaft comprises a stopper on an end part thereof to prevent the pivoting shaft from being loosened from the pivoting shaft hole.

9. The monitor apparatus of claim 8, wherein the stopper is bent such that the end part of the pivoting shaft which passes through the pivoting shaft hole contacts with an edge of the pivoting shaft hole, to generate rotation friction between the pivoting bracket and the first guide plate.

10. The monitor apparatus of claim 6, further comprising at least one washer provided on the pivoting shaft to generate rotation friction between the first guide plate and the pivoting bracket.

11. The monitor apparatus of claim 5, further comprising a tilting hinge provided in an upper part of the connecting member, to tiltably combine the pivoting bracket with the connecting member.

12. The monitor apparatus of claim 2, further comprising a pivoting bracket provided between the connecting member and the first guide plate, wherein the first guide plate is pivotably combined with the pivoting bracket, and the second side of the link unit is combined with the pivoting bracket.

13. The monitor apparatus of claim 12, wherein one of the pivoting bracket and the first guide plate comprises a pivoting shaft, and the other one of the pivoting bracket and the first guide plate comprises a pivoting shaft hole pivotably accommodating the pivoting shaft.

14. The monitor apparatus of claim 13, wherein the pivoting shaft protrudes and passes through the pivoting shaft hole.

15. The monitor apparatus of claim 14, wherein the pivoting shaft comprises a stopper on an end part thereof to prevent the pivoting shaft from being loosened from the pivoting shaft hole.

16. The monitor apparatus of claim 15, wherein the stopper is bent such that the end part of the pivoting shaft which passes through the pivoting shaft hole contacts with an edge of the pivoting shaft hole, to generate rotation friction between the pivoting bracket and the first guide plate.

17. The monitor apparatus of claim 13, further comprising at least one washer provided on the pivoting shaft to generate rotation friction between the first guide plate and the pivoting bracket.

18. The monitor apparatus of claim 12, further comprising a tilting hinge provided in an upper part of the connecting member, to tiltably combine the pivoting bracket with the connecting member.

19. The monitor apparatus of claim 3, further comprising a pivoting bracket provided between the connecting member and the first guide plate, wherein the first guide plate is pivotably combined with the pivoting bracket, and the second side of the link unit is combined with the pivoting bracket.

20. The monitor apparatus of claim 19, wherein one of the pivoting bracket and the first guide plate comprises a pivoting shaft, and the other one of the pivoting bracket and the first guide plate comprises a pivoting shaft hole pivotably accommodating the pivoting shaft.

21. The monitor apparatus of claim 20, wherein the pivoting shaft protrudes and passes through the pivoting shaft hole.

22. The monitor apparatus of claim 21, wherein the pivoting shaft comprises a stopper on an end part thereof to prevent the pivoting shaft from being loosened from the pivoting shaft hole.

23. The monitor apparatus of claim 22, wherein the stopper is bent such that the end part of the pivoting shaft which passes through the pivoting shaft hole contacts with an edge of the pivoting shaft hole, to generate rotation friction between the pivoting bracket and the first guide plate.

24. The monitor apparatus of claim 20, further comprising at least one washer provided on the pivoting shaft to generate rotation friction between the first guide plate and the pivoting bracket.

25. The monitor apparatus of claim 19, further comprising a tilting hinge provided in an upper part of the connecting member, to tiltably combine the pivoting bracket with the connecting member.

26. The monitor apparatus of claim 1, further comprising a pivoting bracket provided between the connecting member and the first guide plate, wherein the first guide plate is pivotably combined with the pivoting bracket, and the second side of the link unit is combined with the pivoting bracket.

27. The monitor apparatus of claim 26, wherein one of the pivoting bracket and the first guide plate comprises a pivoting shaft, and the other one of the pivoting bracket and the first guide plate comprises a pivoting shaft hole pivotably accommodating the pivoting shaft.

28. The monitor apparatus of claim 27, wherein the pivoting shaft protrudes and passes through the pivoting shaft hole.

29. The monitor apparatus of claim 28, wherein the pivoting shaft comprises a stopper on an end part thereof to prevent the pivoting shaft from being loosened from the pivoting shaft hole.

30. The monitor apparatus of claim 29, wherein the stopper is bent such that the end part of the pivoting shaft which passes through the pivoting shaft hole contacts with an edge of the pivoting shaft hole, to generate rotation friction between the pivoting bracket and the first guide plate.

31. The monitor apparatus of claim 27, further comprising at least one washer provided on the pivoting shaft to generate rotation friction between the first guide plate and the pivoting bracket.

32. The monitor apparatus of claim 26, further comprising a tilting hinge provided in an upper part of the connecting member, to tiltably combine the pivoting bracket with the connecting member.

33. The monitor apparatus of claim 4, further comprising a pivoting bracket provided between the connecting member and the first guide plate, wherein the first guide plate is pivotably combined with the pivoting bracket, and the second side of the link unit is combined with the pivoting bracket.

34. The monitor apparatus of claim 33, wherein one of the pivoting bracket and the first guide plate comprises a pivoting shaft, and one of the pivoting bracket and the first guide plate comprises a pivoting shaft hole pivotably accommodating the pivoting shaft.

35. The monitor apparatus of claim 34, wherein the pivoting shaft protrudes and passes through the pivoting shaft hole.

36. The monitor apparatus of claim 35, wherein the pivoting shaft comprises a stopper on an end part thereof to prevent the pivoting shaft from being loosened from the pivoting shaft hole.

37. The monitor apparatus of claim 36, wherein the stopper is bent such that the end part of the pivoting shaft which passes through the pivoting shaft hole contacts with an edge of the pivoting shaft hole, to generate rotation friction between the pivoting bracket and the first guide plate.

38. The monitor apparatus of claim 34, further comprising at least one washer provided on the pivoting shaft to generate rotation friction between the first guide plate and the pivoting bracket.

39. The monitor apparatus of claim 33, further comprising a tilting hinge provided in an upper part of the connecting member, to tiltably combine the pivoting bracket with the connecting member.

40. The monitor apparatus of claim 6, wherein the first guide plate comprises a guide groove, wherein the second side of the link unit passes through the guide groove and is combined to the pivoting bracket at a position separate from a center of the pivoting shaft.

41. The monitor apparatus of claim 33, wherein an angle and a height of the monitor main body are adjustable relative to the base member by pivoting the first guide plate in a direction relative to the pivoting bracket depending on combination locations of the link unit and the pivoting bracket, and of the link unit and the second guide plate.

42. The monitor apparatus of claim 33, wherein the link unit further comprises:
a first hinge shaft and a second hinge shaft respectively combined to a screw hole on end parts thereof.

43. The monitor apparatus of claim 33, wherein a center axis of rotation of the first guide plate and a center axis of rotation of the link unit are different, and the link unit mechanically controls the second guide plate to slide on the first guide plate.

44. The monitor apparatus of claim 9, wherein the monitor main body is rotatable when the rotation friction is overcome by a predetermined force applied by a user.

45. The monitor apparatus of claim 16, wherein the monitor main body is rotatable when the rotation friction is overcome by a predetermined force applied by a user.

46. The monitor apparatus of claim 23, wherein the monitor main body is rotatable when the rotation friction is overcome by a predetermined force applied by a user.

47. The monitor apparatus of claim 30, wherein the monitor main body is rotatable when the rotation friction is overcome by a predetermined force applied by a user.

48. The monitor apparatus of claim 37, wherein the monitor main body is rotatable when the rotation friction is overcome by a predetermined force applied by a user.

49. The monitor apparatus of claim 33, wherein the guide groove is arc-shaped and comprises a connection point between the link unit and the pivoting bracket, wherein when the first guide plate rotates with respect to the connecting member, a connection point between the link unit and the second guide bracket rotates about the connection point between the link unit and the pivoting bracket, to allow the second guide plate to slide upward relative to the first guide plate.

50. A monitor apparatus comprising:
a monitor main body displaying an image;
a base member supporting the monitor main body;
a connecting member combined to the base member, and supporting the monitor main body to be pivoted;
a first guide plate having a first side pivotably combined to the connecting member, and a second side to be slidably combined to the monitor main body; and
a sliding unit provided between the first guide plate and the monitor main body and supporting the first guide plate to be slidable on the monitor main body, the sliding unit comprising a link unit having a first side rotatably combined with respect to the first guide plate and a second side combined with the connecting member, the link unit being separately disposed from the sliding unit such that the monitor main body is rotatably connected to the connecting member and a height, an angle and a position of the monitor main body are adjustable to prevent the monitor main body from contacting with the base member and/or a surface on which the monitor apparatus is located, by controlling a distance between the monitor main body and the base member when the monitor main body is moving up and down and pivoting at a same time, relative to the base member.

51. A monitor apparatus comprising:
a monitor main body displaying an image;
a base member supporting the monitor main body;
a connecting member combined to the base member, and supporting the monitor main body to be pivoted;
a first guide plate having a first side pivotably combined to the connecting member, and a second side to be slidably combined to the monitor main body; and
a sliding unit provided between the first guide plate and the monitor main body and supporting the first guide plate to be slidable on the monitor main body, the sliding unit comprising a link unit having a first side rotatably combined with respect to the first guide plate and a second side combined with the connecting member, the link unit being separately disposed from the sliding unit such that the connecting member is integrally formed to allow the monitor main body to move up and down and pivot at a same time, relative to the base member.

* * * * *

UNITED STATES PATENT AND TRADEMARK OFFICE
CERTIFICATE OF CORRECTION

| | | |
|---|---|---|
| PATENT NO. | : 7,336,478 B2 | Page 1 of 1 |
| APPLICATION NO. | : 10/921980 | |
| DATED | : February 26, 2008 | |
| INVENTOR(S) | : Se-ki Jang | |

It is certified that error appears in the above-identified patent and that said Letters Patent is hereby corrected as shown below:

On the Title Page, Item (57) (Abstract), Line 7, after "unit" delete "provided".

Signed and Sealed this

Twenty-second Day of July, 2008

JON W. DUDAS
*Director of the United States Patent and Trademark Office*